United States Patent
Huang

(10) Patent No.: US 7,549,806 B2
(45) Date of Patent: Jun. 23, 2009

(54) RETRACTABLE LENS ASSEMBLY WITH VARIABLE-VOLUME LENS

(75) Inventor: Chien-Sheng Huang, Taipei (TW)

(73) Assignee: Altek Corporation, Hsinchu (TW)

( * ) Notice: Subject to any disclaimer, the term of this patent is extended or adjusted under 35 U.S.C. 154(b) by 440 days.

(21) Appl. No.: 11/435,714

(22) Filed: May 18, 2006

(65) Prior Publication Data

US 2007/0269201 A1 Nov. 22, 2007

(30) Foreign Application Priority Data

Dec. 30, 2005 (TW) .............................. 94147574 A

(51) Int. Cl.
G03B 17/04 (2006.01)
(52) U.S. Cl. .......................... 396/349; 396/75; 359/665; 359/666; 359/667
(58) Field of Classification Search ................... 396/75, 396/89, 349; 359/665, 666, 667, 704, 726, 359/819
See application file for complete search history.

(56) References Cited

U.S. PATENT DOCUMENTS

| | | | | |
|---|---|---|---|---|
| 5,774,273 A | * | 6/1998 | Bornhorst | 359/665 |
| 5,973,852 A | * | 10/1999 | Task | 359/666 |
| 6,081,388 A | * | 6/2000 | Widl | 359/666 |
| 6,201,933 B1 | * | 3/2001 | Hylen | 396/316 |
| 6,658,208 B2 | * | 12/2003 | Watanabe et al. | 396/89 |
| 6,978,089 B2 | | 12/2005 | Nomura et al. | |
| 2007/0080280 A1 | * | 4/2007 | Havens | 250/201.1 |
| 2007/0201850 A1 | * | 8/2007 | Hendriks et al. | 396/89 |
| 2007/0217022 A1 | * | 9/2007 | Kuiper et al. | 359/666 |
| 2008/0080064 A1 | * | 4/2008 | Kogo et al. | 359/696 |

\* cited by examiner

*Primary Examiner*—Jay M Patidar
(74) *Attorney, Agent, or Firm*—Birch, Stewart, Kolasch & Birch, LLP

(57) ABSTRACT

A retractable lens assembly with a variable-volume lens is provided. The retractable lens assembly includes an optical lens, a variable-volume lens, a fluid pump, a communication tube, and a storage tank. The variable-volume lens includes a lens film, an accommodation space wrapped by the lens film, and a transparent fluid within the accommodation space. Therefore, when the transparent fluid is pumped from the accommodation space to the storage tank by the fluid pump, the variable-volume lens is folded because of atmospheric pressure, such that the overall thickness and volume are reduced. When the variable-volume lens is folded, the thickness of the retractable lens assembly is as small as possible. When the variable-volume lens is stretched out because of being filled with the transparent fluid, the variable-volume lens and the optical lens are of a coaxial configuration, forming a photographic optical system.

10 Claims, 3 Drawing Sheets

RETRACTABLE LENS ASSEMBLY WITH VARIABLE-VOLUME LENS

BACKGROUND OF THE INVENTION

1. Field of Invention

The present invention relates to a retractable lens assembly, and more particularly, to a retractable lens assembly using a variable-volume lens to form a photographic optical system and the retracting method thereof.

2. Related Art

A lens assembly is frequently used in conventional cameras, digital cameras, mobile phones with integrated cameras, and other fields, and is also one of the principal parts thereof. With current market trends, requirements for lightness, thinness, shortness, and smallness are often a large trial for the lens assembly with an unchangeable volume. Therefore, how to miniaturize the digital camera is a problem manufacturers have always been trying to solve. In particular, it is a great contribution to this endeavor whenever the size of the lens can be reduced. Accordingly, relevant patent applications emerge ceaselessly.

For example, U.S. Pat. No. 6,978,089 discloses a retractable lens assembly including a plurality of optical components. When the retractable lens assembly is used, a plurality of optical components are located on a common optical axis. When the retractable lens assembly is in a retracted position, one mobile component of the plurality of optical components is moved to a shifted position off the common optical axis, and the mobile component and at least one of the other components of the plurality of optical components are moved backwards respectively.

Referring to FIG. 1, it shows a structural schematic view of the aforementioned patent. The retractable zoom lens 10 is disposed in a digital camera, which includes a first lens 11, a second lens 12, a third lens 13, a low pass filter 14, and an image sensor 15. When the retractable zoom lens 10 is used, at least one of the first, second, and third lenses 11, 12, 13 go forwards or backwards coaxially to adjust the distances therebetween, such that an image is magnified or minified into the image sensor 15. When the digital camera is retracted (not in use), one lens of the first, second, and third lenses 11, 12, 13 moves off the axis of the adjusted focal length, to be in a state of being abreast with other lenses, such that the overall thickness of the digital camera is reduced. In the embodiment of the patent, the second lens 12 is moved and retracted into a retraction space 16, and thereby a reduction of the overall thickness of the digital camera is achieved.

According to the conventional technique, the thickness of the retracted zoom lens can be reduced, thereby reducing the total thickness of the digital camera. However, the integral design is rather complicated due to the use of many moving mechanisms, and also it has too many components, a high cost, and malfunctions easily.

SUMMARY OF THE INVENTION

It is a main objective of the present invention to provide a retractable lens assembly with a variable-volume lens such that the thickness of folded cameras can be reduced significantly.

The retractable lens assembly with a variable-volume lens provided by the present invention can be applied in a conventional camera, digital camera, video camera, or mobile phone with an integrated camera. The retractable lens assembly comprises an optical lens and a variable-volume lens which are configured coaxially. The variable-volume lens includes a lens film and an accommodation space wrapped by the lens film, and is configured with a storage tank and a communication tube for connecting the accommodation space and the storage tank, such that the transparent fluid in the accommodation space can flow between the accommodation space and the storage tank. Therefore, when the transparent fluid is pumped from the storage tank to the accommodation space by a fluid pump, the variable-volume lens bulges, thus forming a photographic optical system due to a coaxial configuration with the optical lens, and thus the function of a retractable lens assembly is provided. When the transparent fluid is pumped from the accommodation space to the storage tank by the fluid pump, the variable-volume lens will be retracted into a folded state, such that the thickness of the variable-volume lens is reduced, and the optical lens can also be moved back, thus the overall thickness of the camera or video camera can be reduced significantly.

The present invention provides a method for retracting the retractable lens assembly. Corresponding to the retractable lens assembly with a variable-volume lens, the retractable lens assembly comprises an optical lens and a variable-volume lens. The variable-volume lens includes a lens film, an accommodation space wrapped by the lens film, and a transparent fluid. The method for retracting the retractable lens assembly comprises: (1) pumping the transparent fluid out of the accommodation space; and (2) compressing the variable-volume lens. Through this method, the thickness of the variable-volume lens can be reduced as much as possible when not in use.

The action of retracting the whole retractable lens assembly takes place between an object side and an image side, therefore, the retracting method further comprises: (3) moving the optical lens towards the image side; and (4) moving the variable-volume lens towards the image side. In such a way, the thickness of the whole retractable lens assembly is reduced significantly.

Besides, the present invention also provides a method for stretching the retractable lens assembly. The retractable lens assembly comprises an optical lens and a variable-volume lens. The variable-volume lens comprises a lens film, an accommodation space wrapped by the lens film, and a transparent fluid. The retractable lens assembly is located between the object side and the image side. The method for stretching the retractable lens assembly comprises: (1) moving the optical lens towards the object side; (2) filling the transparent fluid to the accommodation space, such that the lens film bulges; and (3) moving the variable-volume lens, such that the variable-volume lens and the optical lens are configured coaxially, thereby forming a photographic optical system. Through the method for stretching the retractable lens assembly, a photographic optical system is formed, and its function becomes available.

In summary, through the technical means of the present invention, problems in the conventional technique can be solved efficiently, such that the thickness of the retractable lens assembly and the whole photographic optical system can be reduced, therefore, the present invention has industrial applicability, is novel, and represents advancement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
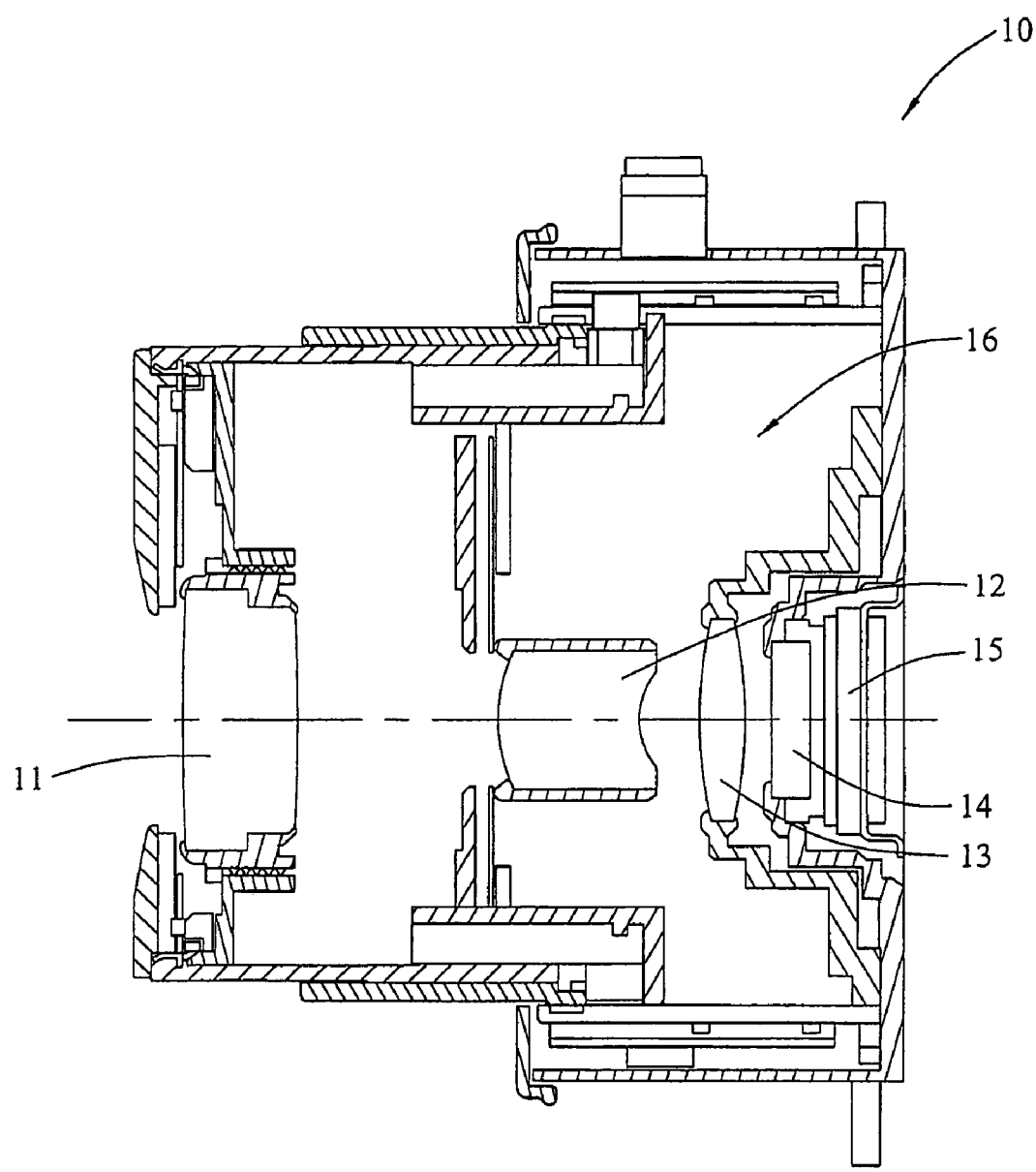
FIG. 1 is a structural schematic view of a conventional retractable lens assembly.
Figure 2:
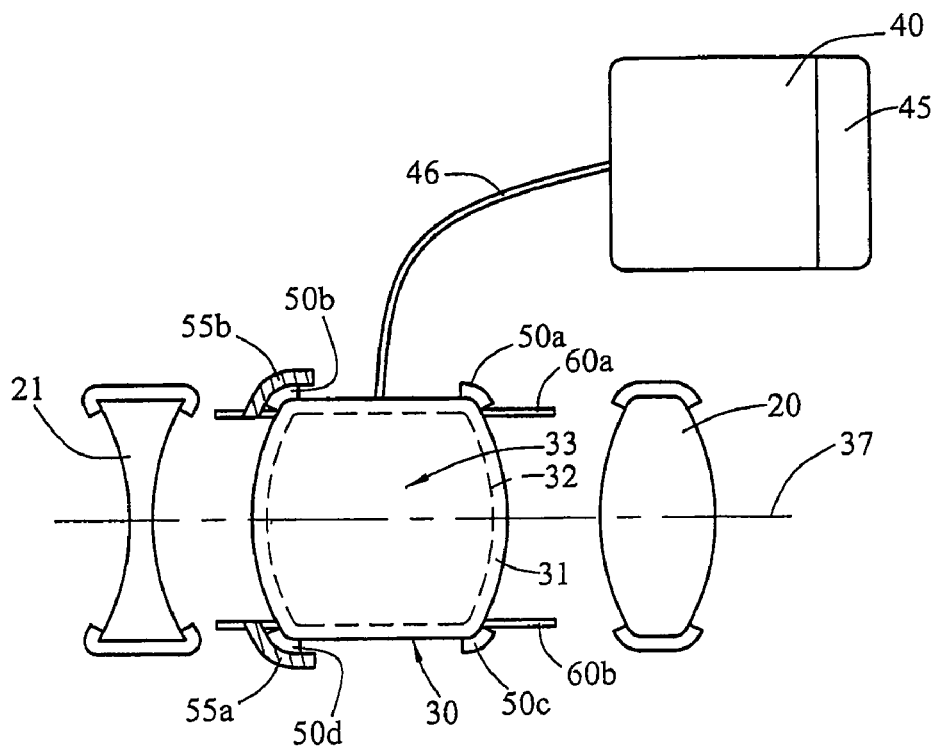
FIG. 2 is a structural schematic view of a retractable lens assembly in a stretched state according the present invention.
Figure 3:
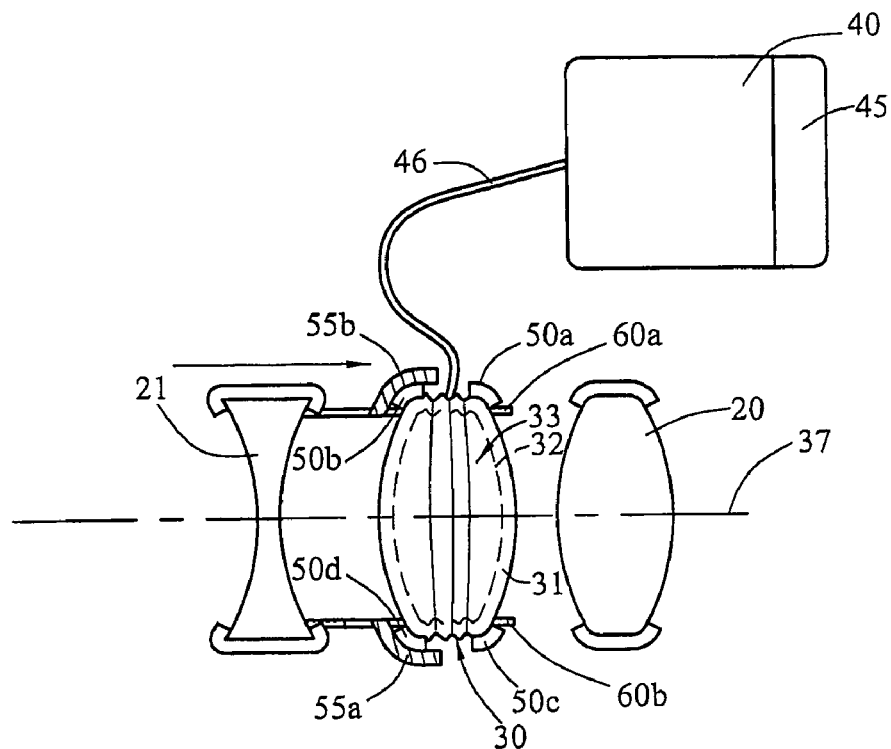
FIG. 3 is a structural schematic view of a retractable lens assembly in a retracted state according the present invention.

Referring to FIG. 2, a retractable lens assembly of the present invention comprises optical lenses 20, 21, a variable-volume lens 30, a storage tank 40, a fluid pump 45, and a communication tube 46. The variable-volume lens 30 includes a lens film 31 and an accommodation space 32 wrapped by the lens film 31. A transparent fluid 33 is disposed in the accommodation space 32, and the communication tube 46 connects the accommodation space 32 and the storage tank 40, for the transparent fluid 33 to flow between the two. The fluid pump 45 is used to pump the transparent fluid 33 from the storage tank 40 to the accommodation space 32, or pump the transparent fluid 33 from the accommodation space 32 to the storage tank 40. Therefore, when the transparent fluid 33 is pumped to the storage tank 40, the variable-volume lens 30 retracts because of atmospheric pressure, taking a folded state, referring to FIG. 3. When the transparent fluid 33 is pumped to the accommodation space 32, the variable-volume lens 30 is stretched out, and is configured coaxially with the optical lenses 20, 21, thus forming a photographic optical system.

In order that the variable-volume lens 30 can be folded easily, and have the function of a photographic optical system when being stretched, frames 50a, 50b, 50c, and 50d, and guide rails 60a and 60b are further disposed in the retractable lens assembly. The frames 50a, 50b, 50c, and 50d are used for fixing the edges of the variable-volume lens 30, and the guide rails 60a and 60b are used for limiting the movement path of the frames 50a, 50b, 50c, and 50d. For example, when the variable-volume lens 30 is folded or stretched, the whole processes of folding and stretching the variable-volume lens 30 are guided by the guide rails 60a and 60b. When the retractable lens assembly is located in a stretched position (ready to take photos), to adjust the focal length of the photographic optical system, the guide rails 60a and 60b can also be used to enable the retractable lens assembly to easily adjust the relation position between the variable-volume lens 30 and the optical lenses 20, 21.

Furthermore, for minimizing the volume of the folded variable-volume lens 30, a flattening mechanism 55a, 55b is also disposed. The flattening mechanism 55a, 55b is actuated when the transparent fluid 33 flows to the storage tank 40 to press the variable-volume lens 30, such that the transparent fluid 33 flows to the storage tank 40 completely, thereby flattening the variable-volume lens 30. In such a way, the thickness of the variable-volume lens 30 is minimized, and the overall volume of the camera or video camera is minimized.

Figure 4:
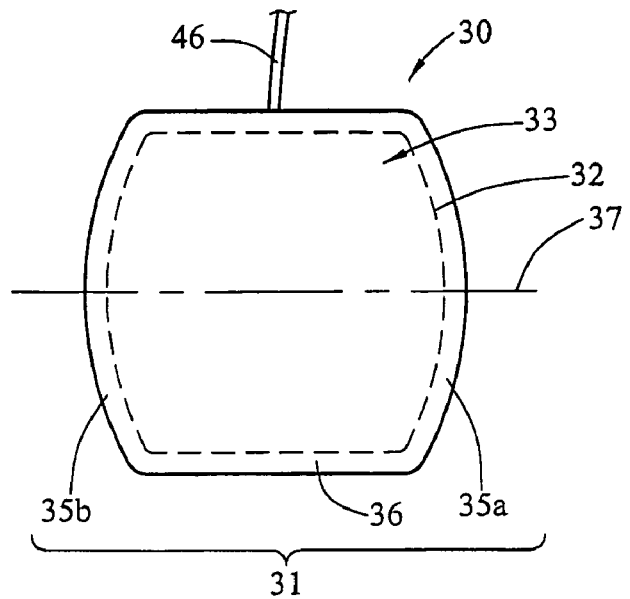
FIG. 4 is a structural schematic view of a variable-volume lens according to the present invention.

Referring to FIG. 4, it shows a structure of the variable-volume lens 30. The lens film 31 comprises optical surfaces 35a, 35b and fold surfaces 36. The optical surfaces 35a, 35b are surfaces intersected with the coaxial line 37. The fold surfaces 36 are the other surfaces except the optical surfaces 35a, 35b. As the functions of the optical surfaces 35a, 35b and the fold surfaces 36 are different, the materials thereof are different. As the optical surfaces 35a, 35b take an important role in the photographic optical system, the optical surfaces 35a, 35b maintain a smooth surface no matter whether the variable-volume lens 30 is folded or stretched, and the refractive index thereof is approximate to that of the transparent fluid 33 within the accommodation space 32. Preferably, the difference of the two refractive indexes is no more than 10%, such that it facilitates the design of the whole photographic optical system. The transparent fluid 33 can also select a matching oil, an inert gas, or other materials commonly used in the optical field. The fold surface 36 is folded, when the transparent fluid 33 flows to the storage tank 40, such that the thickness of the variable-volume lens 30 is minimized.

Figure 5:
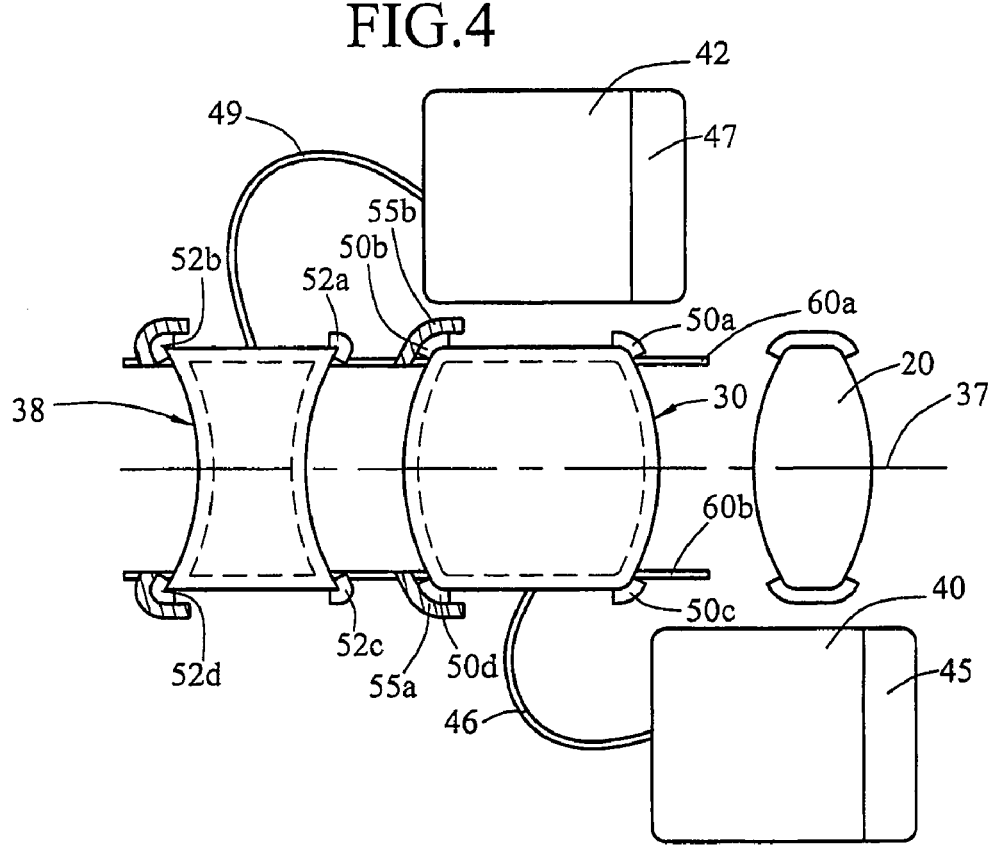
FIG. 5 is another embodiment of the retractable lens assembly according to the present invention.

Referring to FIG. 5, it is a structural schematic view of another embodiment of the present invention. The retractable lens assembly of the present invention adopts two variable-volume lenses 30, 38 and an optical lens 20. Because of two variable-volume lenses 30, 38, two storage tanks 40, 42, two fluid pumps 45, 47, two communication tubes 46, 49, and frames 50a, 50b, 50c, 50d, 52a, 52b, 52c, and 52d are also disposed. Of course, the storage tanks 40, 42 also can be designed as a single storage tank and a single fluid pump, provided that the space for the transparent fluid 33 to flow back is larger than or equal to the sum of the accommodation spaces of the variable-volume lenses 30, 38. By disposing the two variable-volume lenses 30, 38, the thickness of the retractable lens assembly is reduced, and a photographic optical system is formed.

Further, the present invention also provides a method for stretching and retracting the retractable lens assembly. The retractable lens assembly comprises optical lenses 20, 21 and a variable-volume lens 30, referring to FIG. 2. The variable-volume lens 30 includes a lens film 31, an accommodation space 32 wrapped by the lens film 31, and a transparent fluid 33. The whole stretching and retracting action takes place between an object side (i.e. the left side of the optical lens 21 in FIG. 2) and an image side (i.e. the right side of the optical lens 20 in FIG. 2). The method for retracting the retractable lens assembly includes: (1) pumping the transparent fluid 33 out of the accommodation space 32; and (2) compressing the variable-volume lens 30. Through this method, the thickness of the variable-volume lens 30 can be reduced to the smallest effectively when it is not used. To reduce the overall thickness of the retractable lens assembly, two steps are further added: (3) moving the optical lens towards the image side; and (4) moving the variable-volume lens 30 towards the image side.

The stretching method includes the following steps: (1) moving the optical lenses 20, 21 towards the object side; (2) filling the transparent fluid 33 to the accommodation space 32, such that the lens film 31 bulges; and (3) moving the variable-volume lens 30, such that the variable-volume lens 30 and the optical lenses 20, 21 are configured coaxially, and forming a photographic optical system. Through this method for stretching the retractable lens assembly, a photographic optical system is formed, and its function becomes available.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A retractable lens assembly, comprising:
at least one optical lens;
at least one variable-volume lens, including a lens film and an accommodation space wrapped by the lens film;
a storage tank, stored with a transparent fluid;
at least one communication tube, connecting the accommodation space and the storage tank, such that the transparent fluid flows between the accommodation space and the storage tank; and
a fluid pump, selectively moving the transparent fluid from the storage tank to the accommodation space or moving the transparent fluid from the accommodation space to the storage tank;
wherein when the transparent fluid is located in the accommodation space, the optical lens and the variable-volume lens are configured coaxially, thus a photographic optical system is formed, and when the transparent fluid is located in the storage tank, the variable-volume lens is flattened at least one frame, wherein the frame is fixed around the variable-volume lens, for limiting the variable-volume lens and the optical lens to be configured coaxially when the transparent fluid is located in the accommodation space; and at least one guide rail, wherein the guide rail limits the movement route of the frame, and determines a relative position of the variable-volume lens and the optical lens, when the transparent fluid flows between the accommodation space and the storage tank.

2. The retractable lens assembly as claimed in claim 1, wherein the transparent fluid is a matching oil.

3. The retractable lens assembly as claimed in claim 1, wherein the transparent fluid is an inert gas.

4. The retractable lens assembly as claimed in claim 1, further comprising at least one flattening mechanism, wherein the flattening mechanism assists in flattening the variable-volume lens, when the transparent fluid flows from the accommodation space to the storage tank.

5. The retractable lens assembly as claimed in claim 1, wherein the lens film of the variable-volume lens comprises at least one optical surface and at least one fold surface, wherein the optical surface is a surface intersected with a coaxial line when configured coaxially, and the fold surface is the other surface except the optical surface, wherein the materials of the optical surface and the fold surface are different.

6. The retractable lens assembly as claimed in claim 5, wherein the optical surface maintains as a smooth surface when the transparent fluid flows from the accommodation space to the storage tank.

7. The retractable lens assembly as claimed in claim 5, wherein when the fold surface is in a folded state when the transparent fluid flows from the accommodation space to the storage tank.

8. The retractable lens assembly as claimed in claim 5, wherein the optical surface is a convex surface.

9. The retractable lens assembly as claimed in claim 5, wherein the optical surface is a concave surface.

10. The retractable lens assembly as claimed in claim 5, wherein a difference between the refractive indexes of the transparent fluid and the optical surface is within 10%.

* * * * *